United States Patent

Yamamoto et al.

[11] Patent Number: 5,982,568
[45] Date of Patent: Nov. 9, 1999

[54] APPARATUS FOR DETECTING ERROR IN MAGNETIC HEAD FOR USE IN DISK STORAGE SYSTEM

[75] Inventors: Kotaro Yamamoto; Masaaki Habata, both of Tokyo, Japan

[73] Assignee: Kabushiki Kaisha Toshiba, Kawasaki, Japan

[21] Appl. No.: 08/925,471

[22] Filed: Sep. 9, 1997

[30] Foreign Application Priority Data

Jan. 31, 1997 [JP] Japan .................................. 9-018642

[51] Int. Cl.$^6$ .................................................. G11B 27/36
[52] U.S. Cl. .......................... 360/31; 360/113; 360/53; 360/60; 324/212; 369/55
[58] Field of Search ..................... 324/212, 226; 369/53, 55; 360/31, 113, 53, 110, 119, 122, 123, 102, 103, 60, 47

[56] References Cited

U.S. PATENT DOCUMENTS 4,532,802   8/1985   Yeack-Scranton ......................... 360/25
4,670,732   6/1987   Church ..................................... 360/110
5,680,265  10/1997   Nogochi .................................... 360/46

FOREIGN PATENT DOCUMENTS 6-89522   3/1994   Japan .

*Primary Examiner*—Alan Faber
*Attorney, Agent, or Firm*—Finnegan, Henderson, Farabow, Garrett & Dunner, L.L.P.

[57] ABSTRACT

A data storage system that uses a magnetic head assembly having a write head and a read head mounted on a slider to write on and read from a disk. A portion of the coil of the write head is used as a wear sensor for detecting wear on the surface of the slider. A head IC monitors the coil voltage and, when it goes lower than a reference voltage, detects the occurrence of a fault in the write head due to excessive wear on the slider surface. In response to the detection of the fault in the write head by the head IC, a control driver prohibits a write operation and saves data already recorded on the disk.

16 Claims, 9 Drawing Sheets

APPARATUS FOR DETECTING ERROR IN MAGNETIC HEAD FOR USE IN DISK STORAGE SYSTEM

BACKGROUND OF THE INVENTION

The present invention relates to a disk storage system, such as a hard disk drive (HDD), which uses a magnetic head system in which a read head and a write head are separately mounted on a common moving arm and a disk as a storage medium, and performs an operation of reading from or writing on the disk with the heads floating so close to the disk or being in physical contact with the disk.

In order to achieve a further improvement in data recording density, magnetic head systems have been used in hard disk drives in recent years, which use a magnetoresistive (MR) head as the read head and an inductive head as the write head. In order to increase the recording density, it is effective to make the head-to-disk spacing (the flying height of the heads) small.

The magnetic heads are mounted on an air bearing slider (referred to simply as a slider.). The slider is supported by a suspension in the HDA (head/disk assembly) so that it can move across the surface of the disk while maintaining separation from the disk. The slider is formed with a surface called an ABS (air bearing surface) that is opposed to the disk surface and thus floats by the air bearing mechanism due to air flow rotating with the disk.

In order to realize a flying height that is very low, say, of the order of 30 nm, a technique has been developed which forms a protection film on the ABS and forms a protection film or a film of lubricant on the disk surface, thereby maintaining mechanical reliability even if the slider comes in contact with the disk. With such a very low flying height system or a system in which the slider surface and the disk surface are placed in contact, it becomes possible to increase the disk recording density.

With such a system, since the slider comes in contact with the disk, the degree of wear on the slider surface (ABS) or the disk surface will become large. Usually, some wear is taken into account at the time of design of HDD and such a protection film on the slider surface or disk surface as described above is a measure against wear. However, when the HDD is used in such an environment as accelerates wear (for example, an environment which receives a shock from outside), there arises a high possibility that the wear may exceed the allowable range to cause a failure in the HDD.

In particular, when the slider surface wears too much, the gap length of the write head widens, resulting in a failure to perform a write operation properly. On the other hand, since the MR element forming the read head wears when the slider surface wears, its cross-sectional area decreases. At first the resistance of the MR element will increases, leading to the increased apparent reproduction sensitivity. With an increase in the resistance of the MR element the temperature to which the MR element is heated will increase. It is known that the temperature of the MR element is proportional to the square of its resistance and the life of the MR element is exponentially proportional to the reciprocal of the temperature of the MR element. Therefore, the life of the MR element will be exponentially reduced with increasing wear. When the life of the MR element comes to an end, its reproducing capability is lost.

In the event that an error occurs in the write head, subsequent data recording will become impossible. Also, in the event that the read head does not function properly as a result of wear on the MR element, an operation of reading data retained on the disk will become impossible. In the worst case, there is the possibility that all the data retained may be lost.

For this reason, an apparatus has been proposed which is equipped with sensing means for detecting wear on the surface of a magnetic head (electromagnetic transducer) that comes in contact with the disk surface (for example, Japanese Unexamined Patent Publication No. 6-89522). The sensing means comprises two optical waveguides acting as a wear sensor on the surface of the magnetic head and optical detecting means for detecting the phase difference between laser beams reflected by the disk surface back into the optical waveguides. In that Patent Publication, sensor means is also described which comprises two resistor blocks acting as a wear sensor and electrical detecting means which detects the difference in resistance between the two resistor blocks.

That is, the system described in the Patent Publication needs to equip the HDA with additional optical or electrical means. For this reason, the arrangement of the HDA becomes complex, resulting in an increase in the manufacturing cost of the HDD.

BRIEF SUMMARY OF THE INVENTION

It is an object of the present invention to provide an apparatus which uses part of constituent elements of a write head as a wear sensor to detect an error in the write head caused by wear due to contact between the disk surface and the head, thereby preventing a fatal fault due to wear from occurring without making the HDA construction complex and increasing the manufacturing cost. More specifically, the object of the present invention is to allow data already recorded on the disk to be saved using a read head by detecting excessive wear on the slider surface before the read head malfunctions.

To achieve the object, there is provided an apparatus for detecting an error in a magnetic head assembly mounted on a slider in a disk drive including a disk as a storage medium, the apparatus comprising: a detecting material connected with a write coil in the magnetic head assembly and placed in the proximity of the surface of the slider that is opposite a surface of the disk; and detecting means for detecting an error in the magnetic head assembly due to excessive wear on the surface of the slider on the basis of contact between the detecting material and the disk.

The magnetic head assembly comprises a read head that is an MR head and a write head, which are mounted on the slider. The detecting material is, for example, a conductor pattern that is connected to a portion of the coil of the write head. The detecting means monitors the voltage across the coil of the write head and determines the occurrence of an error in the write head due to excessive wear on the slider surface when that voltage is abnormal.

That is, the conductor pattern comes in contact with the disk surface when the slider surface wears excessively as a result of contact between the slider surface and the disk surface. At the time of a write operation, the coil of the write head is supplied with a write current, so that the voltage across the coil is maintained at a predetermined value. When the conductor pattern connected to the coil comes in contact with the disk surface, the coil voltage greatly changes from the predetermined value. On the basis of this voltage change, the detecting means determines that the slider surface has worn excessively and hence an error has occurred in the write head.

In the present invention, the write head is disabled from writing on the disk when the slider surface wears so excessively that the conductor pattern comes in contact with the disk surface. In response to the detection by the detecting means, a host system recognizes the occurrence of an error in the write head and performs an operation of saving data retained on the disk. That is, the host system reads retained data from the disk using the read head and then save it on another storage device before the read head becomes malfunctioned due to excessive wear on the slider surface. Thereby, all the data already recorded on the disk can be saved using the read head before the magnetic head assembly malfunctions due to excessive wear on the slider surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, an embodiment of the present invention will be described with reference to the accompanying drawings.

The embodiment supposes a type of HDD which perform a read/write operation in a state where a magnetic head flies at a very low flying height above the disk surface or is in physical contact with the disk surface.

Figure 1:
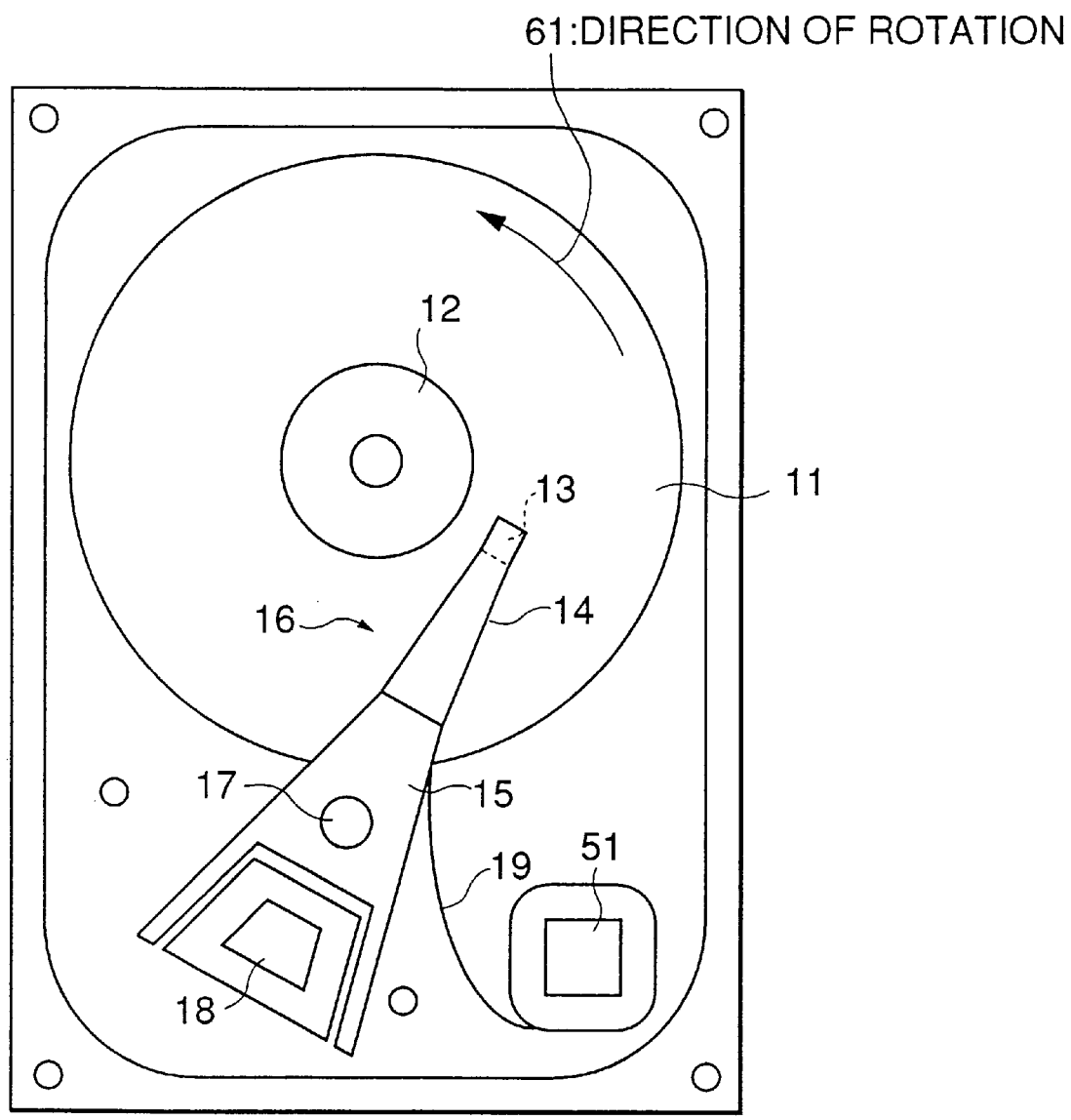
FIG. 1 is a schematic plan view of an HDD to which the present invention is applied.

As shown in FIG. 1, the HDD includes an HDA (head and disk assembly) and a head IC (integrated circuit) 51. The HDA includes a disk 11, a magnetic head assembly 13, and an access mechanism 16. The disk 11, a data storage medium, is rotated at a high speed by a spindle motor 12. A single disk or a stack of disks is mounted on the spindle motor 12.

The magnetic head assembly 13 is provided for each side of a disk or disks so that it is opposite a respective corresponding one of the disk sides. As will be described later, the magnetic head assembly 13 is mounted on a slider (having ABS) supported by a suspension 14. The magnetic head assembly 13 comprises a read head consisting of an MR head and a write head consisting of a thin-film inductive head. The read head and the write head are separately mounted on a common slider, thereby constructing the magnetic head assembly 13.

The access mechanism 16 includes an arm 15 and a voice coil motor (VCM) 18 in addition to the suspension 14. The arm 15 is connected with the suspension 14 by means of welding and rotated on an axis 17 by the VCM 18. Thereby, the magnetic head assembly 13 is allowed to move radially over the disk surface. A control driver, which will be described later in detail, controls the amount and direction of current in the VCM 18 to allow the magnetic head assembly 13 to seek a target location (a track to be accessed) on the disk 11 (refer to FIG. 5). The magnetic head assembly 13 is coupled to the head IC 51 via a flexible printed circuit (FPC) 19. Note that each of the above-described components is mounted in a hermetically sealed container.

(The structure of the magnetic head)

Figure 2A:
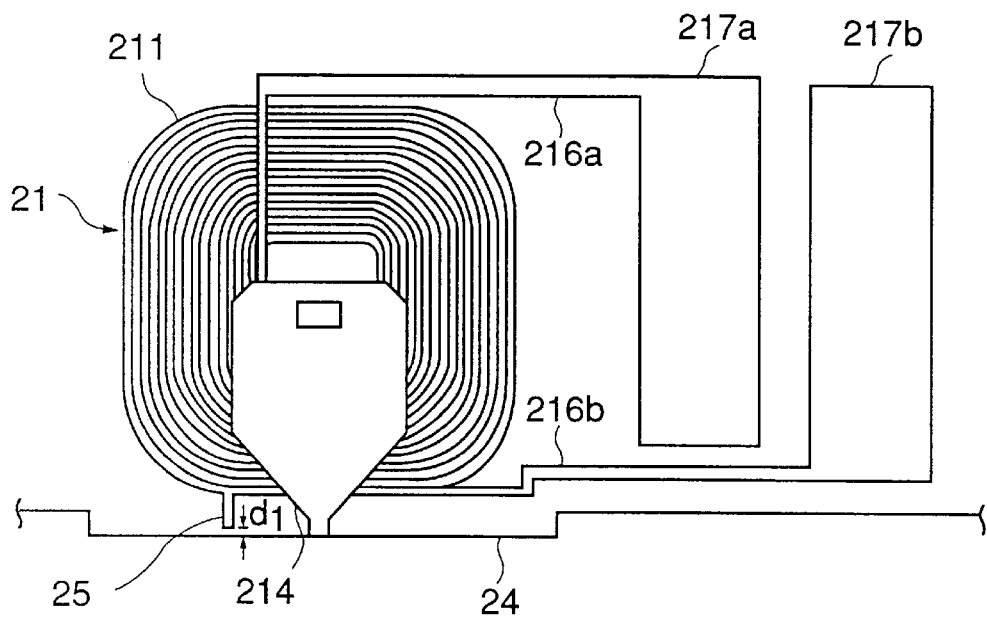
FIGS. 2A and 2B show the structure of a magnetic head assembly according to an embodiment of the present invention.
Figure 2B:
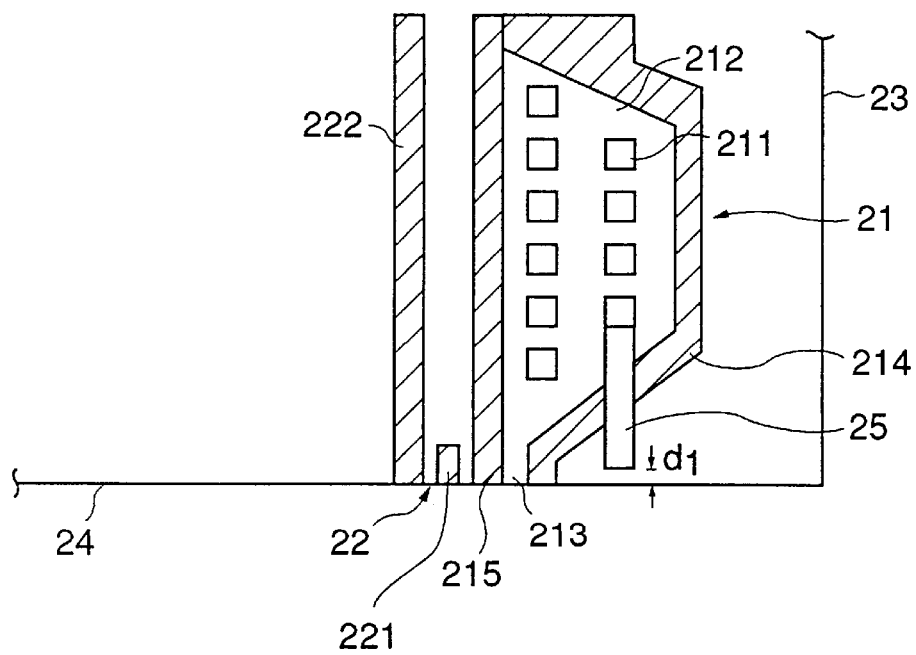

FIGS. 2A and 2B are schematic illustrations of the magnetic head assembly 13. Specifically, FIG. 2A is a view seen from the air outlet side 23 of the slider (see FIG. 6), and FIG. 2B is a sectional view of FIG. 2A.

As shown in FIG. 2B, the magnetic head assembly 13 is constructed from the write head 21 and the read head (MR head) 22 that are separated from each other and mounted on the slider.

The slider has a slider surface (ABS) 24 that is opposite the surface of the disk 11. Here, an end of the magnetic head assembly that is close to the arm 15 is referred to as the front end of the head assembly, and the other end of the head assembly that is far away from the arm is referred to as the rear end of the head assembly. As described above, when the disk 11 rotates, a layer of air that rotates with the disk is produced on the disk 11, so that the layer of air flows into between the ABS 24 of the slider and the disk 11. The side into which the air flows corresponds to the front end of the magnetic head assembly 13 and the side from which the air flows corresponds to the rear end of the magnetic head assembly.

As shown in FIG. 2A, a coil 211 of the write head 21 is formed of a conductor pattern in the shape of a spiral. The coil 211 forms a plurality of layers (it may be of a single layer type). The gap between each turn of the coil is filled with an insulating material such as silicon dioxide ($SiO_2$) (see FIG. 2B). When supplied with a current (write current) at the time of data writing, the coil 211 produces a recording magnetic field across the write gap 213. The ring the coil 211 forms passes through the cylinder-shaped space surrounded by an upper magnetic pole 214 and a lower magnetic pole 215. The ends of the coil 211 are respectively connected by read patterns 216a and 216b to electrodes (connecting terminals) 217a and 217b provided on the wall on the outlet side 23 of the magnetic head assembly 13. The electrodes 217a and 217b are connected to the head IC 51 through the FPC 19 (see FIG. 1).

As shown in FIG. 2B, the read head 22 is placed next to the write head 21. The read head 222 comprises an MR element 221, which is placed between the lower magnetic pole 215 that also serves as an upper shield for preventing crosstalk between adjacent tracks and a lower shield 222. The lower magnetic pole 215 is a constituent element of the write head 21. As with the coil 211, the MR element 221 is connected to the head IC 51 through the FPC 19.

The feature of the magnetic head assembly 13 of the present embodiment is that a portion of the conductor pattern of the coil 211 is protruded toward the slider surface 24 so that it will serve as a wear sensor (wear sensing probe) 25. The wear sensor 25 may be made of an additional conductor pattern attached to a portion of the conductor pattern of the coil 211. The spacing between the tip of the wear sensor 25 and the slider surface 24 is set to d1.

Figure 3:
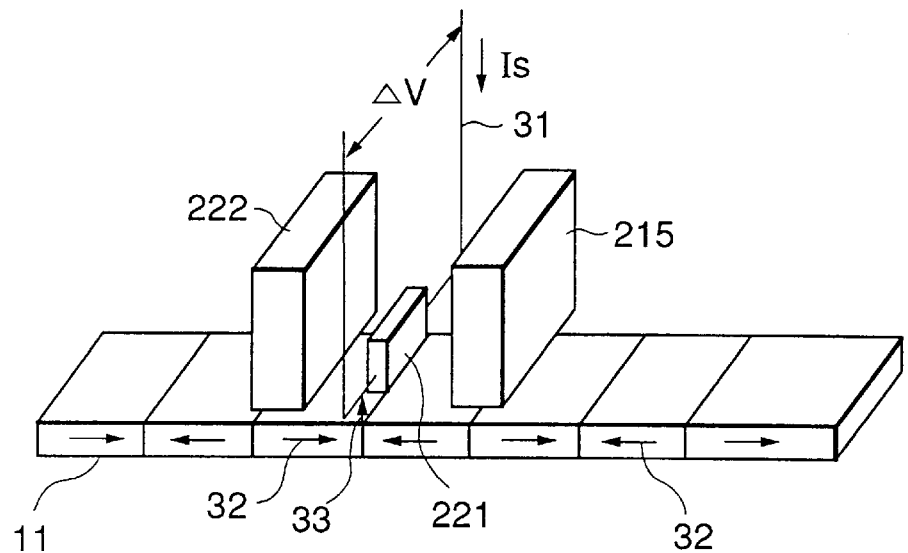
FIG. 3 is a diagram for use in explanation of the operating principles of the MR element of the magnetic head assembly of FIG. 2B.

In the HDD, at the time of writing the head IC 51 supplies the coil 211 of the write head 21 with a write current (DC current). Thereby, magnetic flux (recording magnetic field) is produced across the write gap 213 between the magnetic poles 214 and 215 of the write head 21 to allow data to be recorded on the disk 11. In the read operation, as shown in FIG. 3, the MR element 221 of the read head 22 is supplied with a DC sense current Is through a sense line 31. The read head 22 reads data recorded on the disk 11 by detecting a change in resistance of the MR element 221 that occurs when the MR element crosses a magnetic field 33 based on data magnetically recorded on the disk (magnetized in the direction of an arrow 32) as a change in voltage ΔV.

(Error detecting operation of the magnetic head)

In the present embodiment, it is supposed that the slider surface 24 on which the magnetic head assembly 13 is mounted is in physical contact with the surface of the disk 11 or flies very low above the disk surface. More specifically, it is supposed that the electromagnetic transducer 20 placed on the air outlet side 23 of the magnetic head assembly 13 is in contact with or virtually in contact with the disk surface (see FIG. 6).

Figure 4:
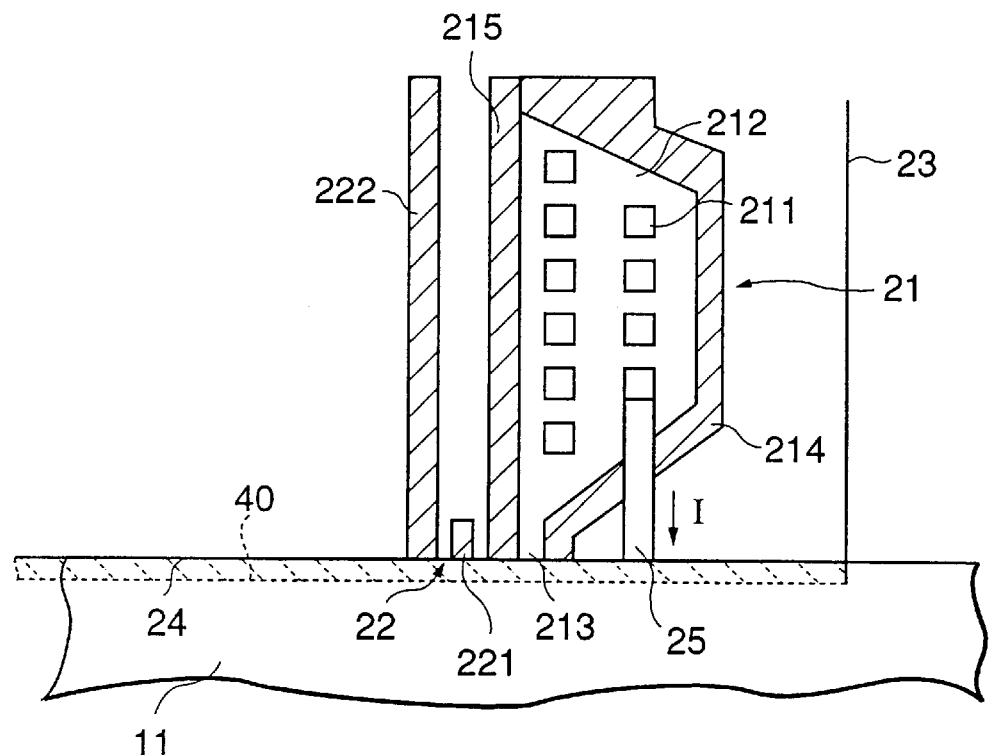
FIG. 4 shows a state of wear on the magnetic head assembly.

In such a case, it will be understood that that portion of the slider surface 24 on which the electromagnetic transducer 20 is mounted will gradually wear with the employment of the HDD. If, therefore, the slider surface 24 wears down through a portion 40 corresponding in thickness to the spacing d1 as shown in FIG. 4, then the tip of the wear sensor 25 will come below the slider surface 24, so that it comes in contact with the disk surface.

Suppose here the case, in such a state where the wear sensor 25 is in contact with the disk surface, the HDD performs a write operation. In the write operation, the coil 211 of the write head 21 is supplied by the head IC 51 with a write current I, which flows from the coil 211 through the wear sensor 25 into the disk 11. It is here supposed that the surface of the disk 11 is electrically conductive.

When the current I flows into the disk, the voltage across the coil 211 will fall. Thus, the wear sensor 25 being in contact with the disk surface can be detected by measuring the voltage across the coil 211 of the write head 21 through the electrodes 217a and 217b shown in FIG. 2A. In other words, by detecting that the voltage across the coil 211 is abnormal, it can be presumed that the slider surface 24 has worn so excessively as to develop a failure in the write head 21.

(Arrangement of the head IC and the data saving operation)

Figure 5:
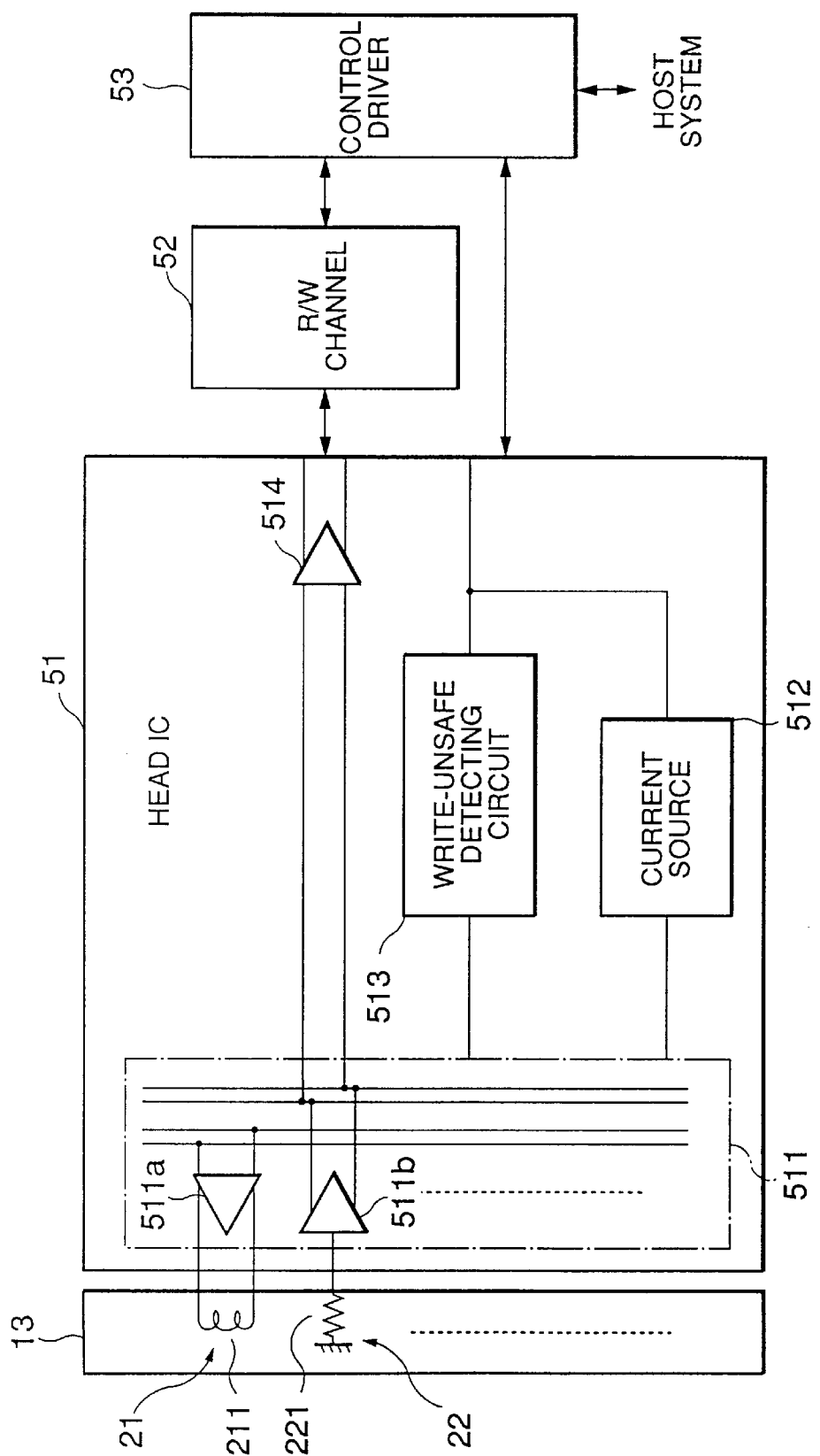
FIG. 5 is a block diagram of a head IC including wear detecting means for use in the HDD.

FIG. 5 shows an arrangement of the head IC51 connected to the magnetic head assembly 13 through the FPC 19. The head IC 51 comprises a read/write driver 511, a current source 512, a write-unsafe detector 513, and a preamplifier 514. The read/write driver 511 includes a write driver 511a for causing a write current (write data) to flow through the coil 211 of the write head 21 and a read driver 511b for detecting a voltage developed across the MR element 221 of the read head 22. The current source 512 supplies a write current to the coil 211 of the write head 21 at the time of data writing.

The write-unsafe detector 513 measures a voltage across the coil 211 of the write head 21 at the time of a write operation and, when the measured voltage is lower than a preset reference value, determines that a writing fault has occurred to deliver a write-unsafe signal (write fault signal) to a control driver 53. Here, usually the writing fault is an error in the write head 21 resulting from imperfect contact, disconnection, short-circuiting, or the like of the lead wires of the write head.

The preamplifier 514 amplifies a read signal produced by the read head 22 and detected by the read driver 511b and outputs it to a read/write channel 52, which is a read/write IC for performing various signal processes to recover data from the read signal and a process for modulating write data.

The control driver 53 is the main controller in the HDD and constructed from a microprocessor, a ROM storing control programs executed by the microprocessor, a readable/writable RAM, a rewritable, nonvolatile memory such as EEPROM, and a disk controller (HDC). Upon receipt of the writing-unsafe signal from the write-unsafe detector 513, the control driver 53 judges that a writing fault (fault in the write head) has occurred and then disables the write operation. Specifically, the control driver disables write data from being output to the head IC 51.

In the present embodiment, the write-unsafe circuit 513 can also measure a fall in voltage across the coil 211 due to excessive wear on the magnetic head assembly 13 (specifically the slider surface). That is, when the slider surface wears excessively and hence the wear sensor 25 comes into contact with the disk surface, the current in the coil 211 flows into the disk surface and the voltage across the coil falls below the reference value. The write-unsafe circuit 513 outputs a write-unsafe signal to the control driver 53 even in the event of a writing fault (fault in the write head) due to excessive wear on the slider surface. That is, the present embodiment needs no provision of any detector in the head IC 51 for the purpose of detecting a writing fault due to excessive wear on the slider surface. This is because the conventional write-unsafe circuit 513 adapted for detecting writing fault is used for that purpose.

Upon receipt of a write-unsafe signal from the write-unsafe detector 513, the control driver 53 disables the write operation as in the conventional arrangement. It is supposed here that the writing capability of the write head 21 is lost due to excessive wear on the slider surface. In this case, the control driver 53 causes the read head 22 to read data recorded on the disk 11 and performs an operation of saving read data. Specifically, the control driver 53 informs the host system (personal computer) of the occurrence of a writing fault and makes a request to it for data save. In response to this, the host system prompts the user to specify a storage medium for saving data recorded on the disk. The host system saves the disk data transferred from the control driver on the storage medium (for example, another HDD) specified by the user.

Therefore, since the malfunction of the write head 21 due to excessive wear on the slider surface can be detected, writing new data onto the disk 11 can be prohibited. Further, before the capability of the read head 22 is lost, data recorded on the disk can be read and saved on another storage medium.

Here, the spacing d1 between the tip of the wear sensor 25 and the slider surface 24 of the magnetic head assembly 13 will be discussed. The spacing d1 is the amount (height) of wear allowed for the magnetic head assembly 13 until the tip of the wear sensor 25 becomes flush with the slider surface 24, i.e., the allowable wear limit value of the write head 21. On the other hand, the upper limit value (allowable wear limit value) of the amount of wear on the MR element 221 of the read head 22 that allows the MR element to perform its reading function is supposed to be d2.

In the present embodiment, the allowable wear limit value dl of the write head 21, i.e., the spacing dl between the tip of the wear sensor 25 and the slider surface 24 of the magnetic head assembly, is set smaller than the allowable wear limit value d2 of the MR element 221. Thus, by allowing the tip of the wear sensor 25 to become flush with the slider surface 24 before the reading capability of the MR element is lost due to wear on the slider surface of the magnetic head assembly 13, the occurrence of a writing fault can be detected by the write-unsafe detector 513. That is, even when the write head 21 becomes disabled from writing data on the disk due to wear on the slider surface of the magnetic head assembly, the read head is allowed to perform a read operation. Thus, the control driver 53 can inform the host system of the occurrence of a writing fault (fault in the write head) to save data recorded on the disk, preventing important data from being lost.

In the present embodiment, an MR head using the MR element 221 is used as the read head 22. Alternatively, a GMR (giant magnetoresistive) head may be used instead.

Figure 6:
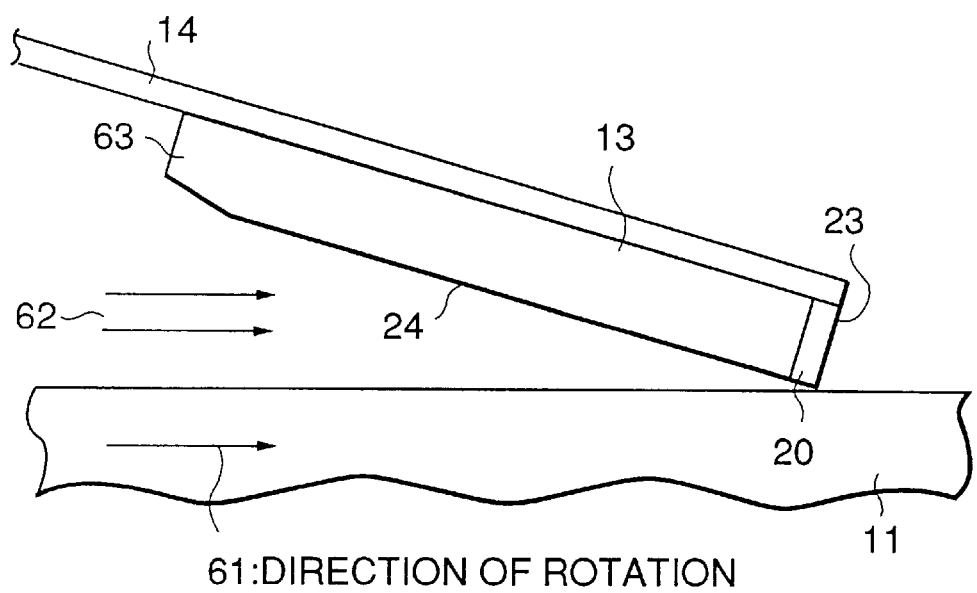
FIG. 6 shows a positional relationship between the slider and disk.
Figure 7:
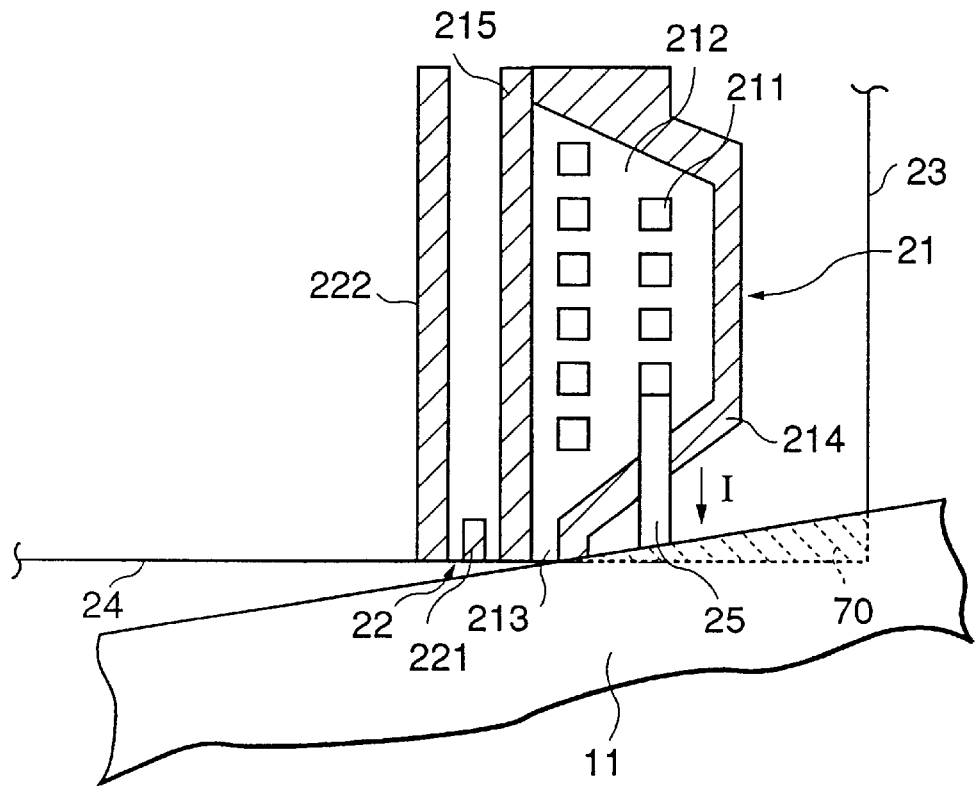
FIG. 7 shows a state of wear on the slider of FIG. 6.

The present embodiment supposes the case where all the slider surface 24 of the magnetic head assembly 13 comes in physical contact with the disk surface and wears. In practice, however, the air inlet side 63 of the magnetic head assembly 13 flies just above the disk surface and the air outlet side 23 comes in contact with the disk surface as shown in FIG. 6. That is, when the disk 11 rotates relative to the head 13 in the direction indicated by an arrow 61, air flow 62 is produced on the disk in substantially the same direction as the direction 61 of rotation. When the slider surface 24 of the head assembly 13 receives the air flow 62, the air inlet side 63 of the head assembly flies slightly above the disk surface. Thus, the magnetic head assembly 13 slants with respect to the disk surface so that the air outlet side 23 of the slider surface 24 forms the lowest point. For this reason, the electromagnetic transducer 20 placed on the air outlet side 23 of the magnetic head assembly 13 comes in physical contact with the disk surface.

Due to such a slanting posture of the magnetic head assembly 13, the wear on the magnetic head assembly starts at a portion 70 of the slider surface 24 on the air outlet side 23. After that, the wear on the magnetic head assembly extends to the write gap 213 and then to the MR element 221. In this case, on the wear sensor 25 side the slider surface 24 wears more than on the MR element 221 side. It therefore follows that there is sufficient time to detect the limit on wear on the magnetic head assembly 13 using the wear sensor 25 before the reading capability of the MR element 221 is lost.

(First modification)

The magnetic head assembly 13 of the embodiment described above has the structure such that a predetermined spacing dl is set between the tip of the wear sensor 25 and the slider surface 24 and the tip is set back from the slider surface 24. However, it is difficult to process the slider so that the spacing between the tip of the wear sensor and the slider surface is held constant. A first modification is directed to a magnetic head assembly in which the tip of the wear sensor is set flush with the slider surface.

Figure 8:
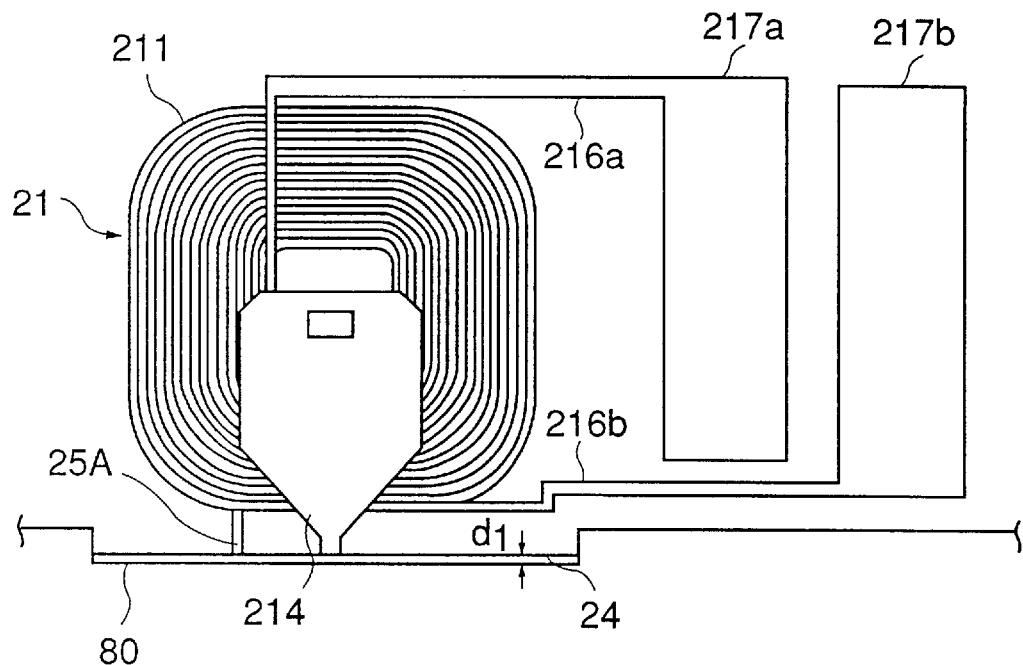
FIG. 8 shows a first modification of the magnetic head assembly of the present invention.

FIG. 8 shows the first modification. In this figure, like reference numerals are used to denote corresponding parts to those in FIG. 2A. As shown in FIG. 8, the tip of a wear sensor 25A formed by extending a portion of the coil 211 of the write head 21 (or a conductor pattern attached to part of the coil) is flush with the slider surface 24. With such a structure, it becomes easy to process the slider portion of the magnetic head assembly 13.

With such a structure, however, when the slider surface 24 comes in physical contact with the disk 11 at the time of writing, a write current supplied to the coil 211 will flow into the disk irrespective of the presence or absence of wear on the slider surface 24. In this modification, therefore, an insulating protection film 80 of d1 in thickness (corresponding to the spacing dl between the tip of the wear sensor and the slider surface in the above-described embodiment) is formed on the slider surface 24. This protection film will avoid the tip of the wear sensor being brought into direct contact with the disk surface. In addition, the protection film provides protection of the slider surface 24 and prevention of the corrosion of the MR element 221 and the magnetic poles 214 and 215.

Even with the magnetic head assembly 13 thus designed, if the protection film 80 wears excessively as a result of physical contact with the disk surface, then the tip of the wear sensor 25A will come in physical contact with the disk surface. As in the embodiment described previously, the current flowing through the coil 211 of the write head 21 will flow into the disk surface through the wear sensor 25A. Thus, the voltage across the coil 211 goes lower than the reference value. That is, the write-unsafe detector 513 in the head IC 51 of FIG. 5 detects a writing fault (fault in the write head 21) due to excessive wear on the protection film 80 to output a write-unsafe signal to the control driver 53. The control driver then informs the host system of the writing fault and makes a request to it for data save.

(Second Modification)

Figure 9:
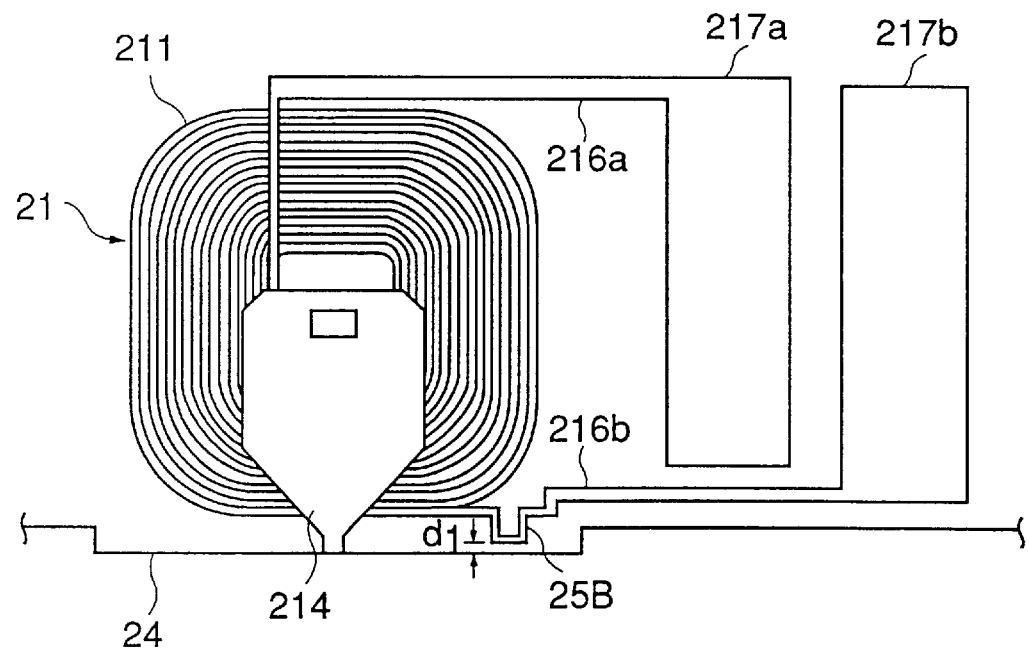
FIG. 9 shows a second modification of the magnetic head assembly of the present invention.

FIG. 9 shows a second modification, which, unlike the structure in which a portion of the coil 211 of the write head 21 is used as the wear sensor 25 or 25A, uses a portion of the read pattern 216a on the slider surface side as a wear sensor 25B (wear sensing probe).

As shown in FIG. 9, the magnetic head assembly 13 has the read patterns 216a and 216b which respectively connect the electrodes 217a and 217b to the coil 211 of the write head 21. An intermediate portion of the read pattern 216a is bent to protrude toward the slider surface 24 to form the wear sensor 25B. The spacing between the wear sensor 25B and the slider surface 24 is set equal to the spacing d1 between the wear sensor 25 and the slider surface 24.

Even with the magnetic head assembly 13 thus designed, if the slider surface 24 wears excessively as a result of physical contact with the disk surface, then the tip of the wear sensor 25B will come in physical contact with the disk surface. As in the embodiment described previously, the current flowing through the coil 211 of the write head 21 will flow into the disk surface through the wear sensor 25B. Thus, the voltage across the coil 211 goes lower than the reference value. That is, the write-unsafe detector 513 in the head IC 51 detects a writing fault (fault in the write head 21) due to excessive wear on the slider surface 24 to output a write-unsafe signal to the control driver 53, which, in turn, informs the host system of the writing fault and makes a request to it for data save.

(Modification of the head IC)

Figure 10:
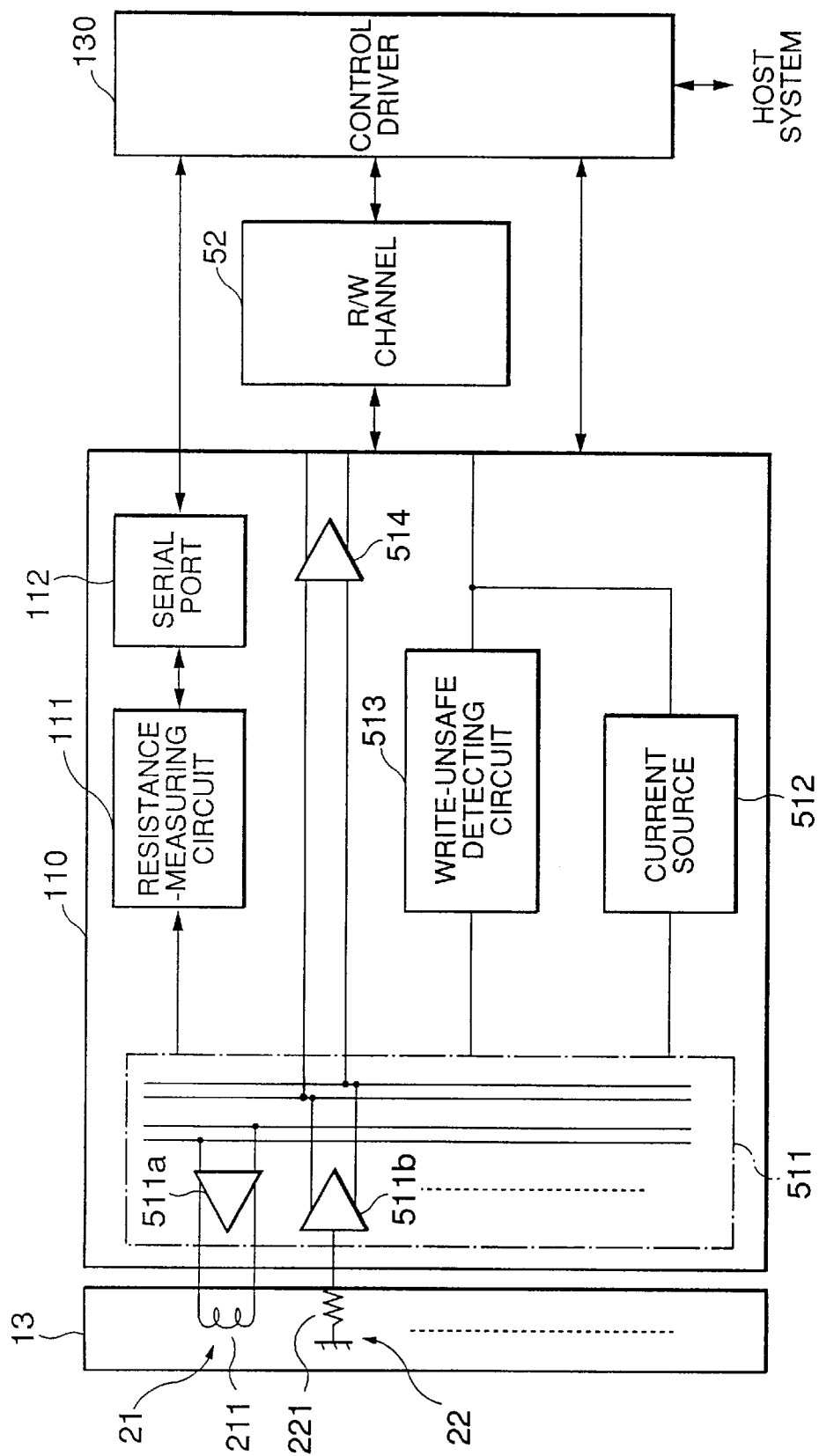
FIG. 10 is a block diagram of a head IC including a write head resistance measuring circuit for use in the HDD.

FIG. 10 is a block diagram of a modification of the head IC 51. The present embodiment using the head IC 51 supposes that the surface of the disk is electrically conductive. That is, when the wear sensor (25, 25A, or 25B) comes in contact with the disk surface as a result of wear on the slider surface 24, the current flowing through the coil 211 of the write head 21 flows into the disk surface, lowering the voltage across the coil 211. The head IC 51 monitors (measures) the voltage across the coil 211 and outputs a write-unsafe signal when that voltage is lower than the reference voltage. Thereby, a writing fault (fault in the write head 21) due to excessive wear on the slider surface can be detected to save data recorded on the disk 11.

If the disk surface is made nonconductive, the current in the coil 211 will not flow into the disk surface even when the wear sensor comes in physical contact with the disk surface. For this reason, the system for detecting coil voltage cannot detect a writing fault due to excessive wear on the slider surface 24. In other words, when the disk surface is nonconductive, the write-unsafe circuit 513 in the conventional head IC 51 cannot detect a writing fault due to excessive wear on the slider surface.

When used with an HDD using a disk whose surface is nonconductive, a modified head IC 110 allows a writing fault (fault in the write head 21) due to excessive wear on the slider surface 24 to be detected.

In FIG. 10, like reference numerals are used to denote corresponding parts to those in FIG. 5 and their descriptions are omitted.

As shown in FIG. 10, the head IC 110 includes a resistance measuring circuit 111 for measuring the resistance of the coil 211 of the write head 21 via the electrodes 217a and 217b and a serial port 112. The serial port is a transmission means for transmitting the measurements to the control driver 130. The control driver has a function of determining a writing fault due to excessive wear on the magnetic head assembly 13 by making a comparison between the resistance measured by the resistance measuring circuit 111 and the reference resistance in addition to the function described in connection with FIG. 5. The control driver 130 commands the resistance measuring circuit 111 to measure the resistance of the write head 21 via the serial port 112.

The reference resistance is determined at the time of manufacture of HDD (prior to shipment) by measuring the resistance of the write head 21 using the resistance measuring circuit 111 and adding a margin value to the measured value. The reference resistance value is stored in the EEPROM in the control driver 130. In the case of HDD equipped with multiple heads 13, the head resistance determination is made for each head. Alternatively, the reference resistance may be determined from a design value.

Figure 11:
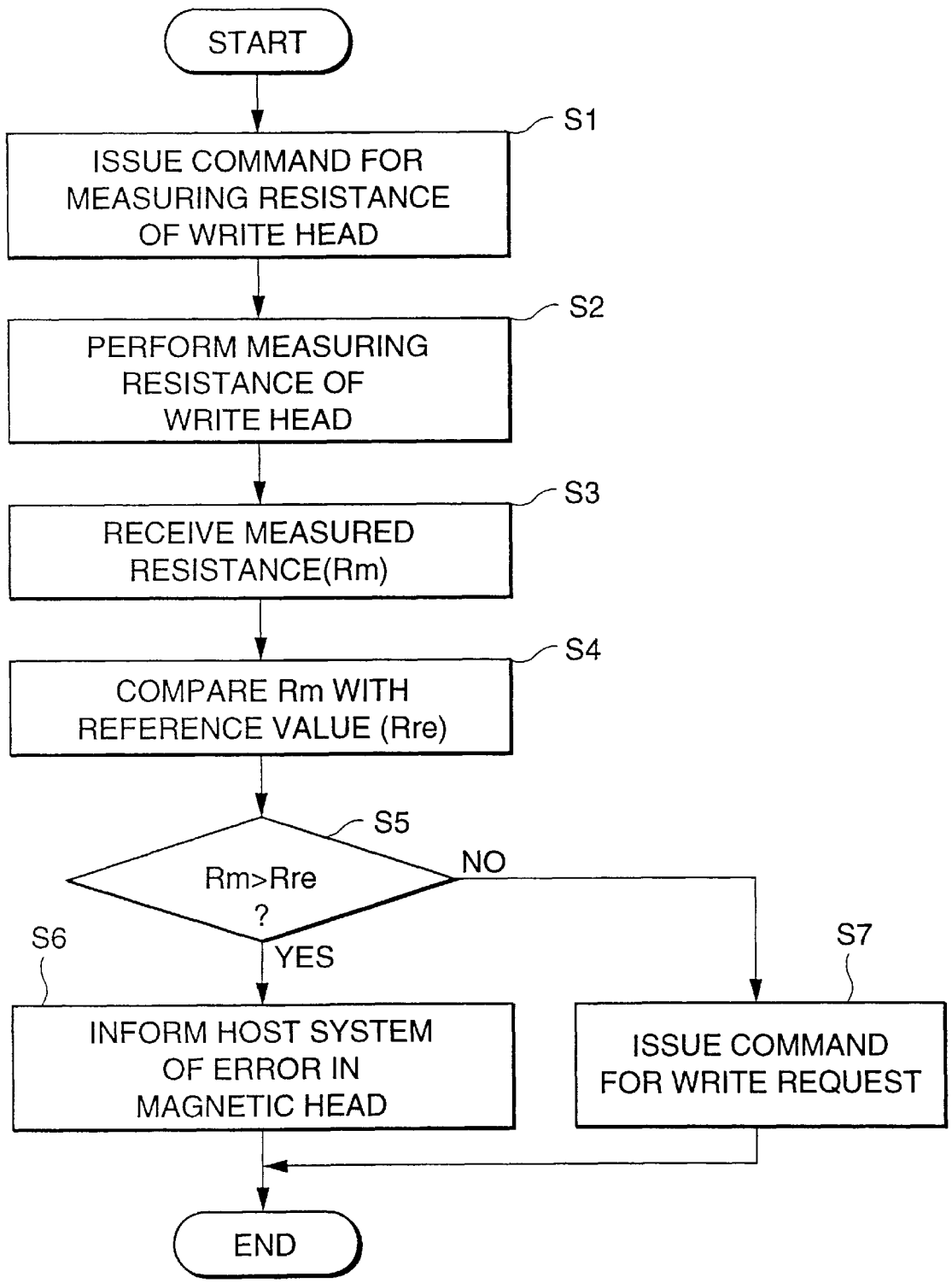
FIG. 11 is a flowchart for detecting a failure in the head in the HDD using the head IC of FIG. 10.

The process of detecting a writing fault by the head IC 110 and the control driver 130 will be described with reference to a flowchart shown in FIG. 11.

As described above, when wear on the slider surface 24 progresses as a result of physical contact between the magnetic head assembly 13 (slider surface) and the disk surface, a situation results in which the wear sensor 25 forming part of the coil 211 of the write head 21 comes in physical contact with the disk surface. When the wear on the slider surface 24 further progresses, the wear sensor 25 (conductor pattern) also wears, so that it becomes thin. Consequently, the resistance of the coil 211 increases. When the wear further progresses, the coil 211 becomes disconnected at the wear sensor 25.

In making a request to the head IC 110 for writing onto the disk 11, the control driver 130 issues to the resistance measuring circuit 111 via the serial port 112 a command for measuring the resistance of the write head (step S1). In response to that command, the resistance measuring circuit 111 measures the resistance of the write head through the electrodes 217a and 217b and provides the measured value (Rm) to the control driver 130 via the serial port 112 (step S2).

Upon receipt of the measured value from the resistance measuring circuit 111, the control driver 130 makes a comparison between the measured value (Rm) for the resistance of the coil 211 and the reference resistance (Rre) (steps S3 and S4). When the measured resistance value (Rm) is greater than the reference resistance value (Rre) (YES in step S5), the control driver 130 determines that the limit on wear on the magnetic head assembly (slider surface) has been reached and then informs the host system of the occurrence of a fault in the magnetic head assembly (step S6).

If, on the other hand, the measured resistance is not greater than the reference resistance (NO in step S5), then the control driver 130 determines that the wear limit is not reached and then issues to the head IC 110 a request for data writing (step S7).

Note that the coil resistance measurement need not necessarily be made prior to writing on the disk. For example, the resistance measurement may be made after writing on the disk. Alternatively, the resistance measurement may be made at regular intervals independently of writing on the disk.

Figure 12:
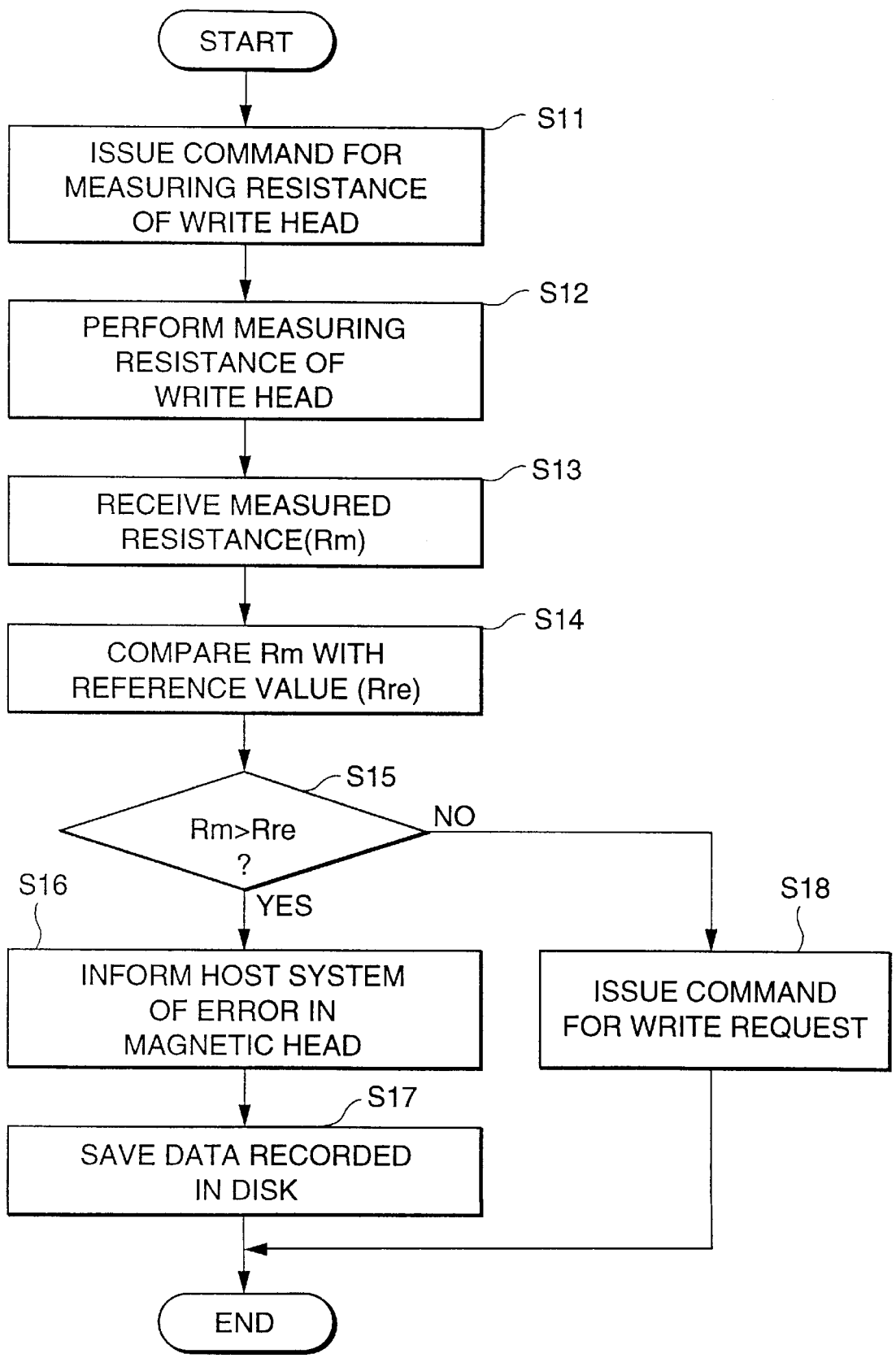
FIG. 12 is another flowchart for detecting a failure in the head in the HDD using the head IC of FIG. 10.

FIG. 12 is a flowchart for the processes of detecting a writing fault and saving data by the head IC 110 and the control driver 130. Steps S11 to S16 and S18 are the same as steps S1 to S7 in FIG. 11 and descriptions thereof are omitted.

When the measured resistance (Rm) is greater than the reference resistance (Rre), the control driver 130 decides that the magnetic head assembly 13 (slider surface 24) has reached the limit on wear and informs the host system of the occurrence of a fault in the magnetic head (step S16). In addition, the control driver 130 makes a request to the host system for saving data recorded on the disk 11. In response to this, the host system prompts the user to specify a recording medium on which data recorded on the disk are to be saved. The host system then saves data recorded on the disk on the recording medium (e.g., another HDD) specified by the user (step S17).

According to the present invention, as described above, in a data recording system using heads that fly very low above the disk surface or are in contact with the disk surface to ensure high recording density, the coil in a write head can be used as a wear sensor for detecting excessive wear on the head (slider). This eliminates the need for a special device as the wear sensor. Thus, a fault in the write head due to excessive wear can be detected without making the head complex in structure or increasing the manufacturing cost. Further, when a fault in the write head is detected, a new write operation is prohibited before the read head malfunctions due to excessive wear. In this case, data recorded on the disk can be read by the properly functioning read head and saved on another recording medium. That is, in the event of a write head malfunction, data already recorded on the disk can be saved for protection.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An apparatus for detecting an error in a magnetic head assembly mounted on a slider in a disk drive including a disk as a storage medium, the apparatus comprising:

a detecting material connected with a write coil in the magnetic head assembly and placed in the proximity of the surface of the slider that is opposite a surface of the disk; and detecting means for detecting an error in the magnetic head assembly due to excessive wear on the surface of the slider on the basis of contact between the detecting material and the disk.

2. The apparatus according to claim 1, wherein the detecting material comprises a conductor pattern connected to the write coil of the magnetic head assembly and placed in the proximity of the surface of the slider, and the detecting means detects an error in the magnetic head assembly on the basis of a change in the voltage across or resistance of the write coil of the magnetic head assembly due to contact between the conductor pattern and the disk.

3. The apparatus according to claim 1, wherein the detecting means includes means for detecting the voltage across or resistance of the write coil of the magnetic head assembly and detects an error in the magnetic head assembly on the basis of a change in the voltage or resistance due to contact between the detecting material and the disk.

4. The apparatus according to claim 1, wherein the surface of the disk is conductive, and the detecting means detects an error in the magnetic head assembly on the basis of the voltage across the write coil of the magnetic head assembly that changes on contact between the detecting material and the disk.

5. An apparatus for detecting an error in a magnetic head assembly having a read head and a write head that are mounted on a slider in a disk drive using a disk as a storage medium, the apparatus comprising:

a detecting material connected with the coil of the write head and placed in the proximity of the surface of the slider that is opposite a surface of the disk; and detecting means for detecting an error in the magnetic head assembly due to excessive wear on the surface of the slider on the basis of contact between the detecting material and the disk.

6. The apparatus according to claim 5, wherein the detecting material consists of a conductor pattern connected to the write coil of the write head and placed in the proximity of the surface of the slider, and the detecting means detects an error in the write head on the basis of a change in the voltage across or resistance of the coil of the write head due to contact between the conductor pattern and the disk.

7. The apparatus according to claim 5, wherein the detecting means includes means for detecting the voltage across or resistance of the write coil of the magnetic head assembly and detects an error in the write head on the basis of a change in the voltage or resistance due to contact between the detecting material and the disk.

8. The apparatus according to claim 5, further comprising saving means for, when the detecting means detects an error in the write head, causing the read head to read data recorded on the disk and saving the data on a specified storage medium.

9. The apparatus according to claim 5, wherein the surface of the disk is conductive, and the detecting means detects an error in the write head on the basis of the voltage across the coil of the write head that changes on contact between the detecting material and the disk.

10. The apparatus according to claim 5, wherein the detecting material consists of a conductor pattern having its part that is flush the surface of the slider on which an insulating protection film is formed, and the detecting means detects an error in the write head on the basis of a change in the voltage across the coil of the write head due to contact between the part of the conductor pattern and the disk which is caused by wear on the protection film.

11. The apparatus according to claim 5 wherein the slider is an air bearing slider and is mounted with the magnetic head assembly on the side of outlet of air flow resulting from rotation of the disk, and the write head in the magnetic head assembly is positioned to the air flow outlet side relative to the read head.

12. A disk storage system that includes a read head and a write head that are mounted on a slider, and a disk as a storage medium, the system comprising:

a detecting material connected to the coil of the write head and placed in the proximity of the surface of the slider that is opposite a surface of the disk;

head driver means having a driver circuit for driving the read head or the write head to read from or write on the disk and a detector circuit for detecting electrical characteristics of the write head at the time of writing on the disk; and determining means for determining that an error has occurred in the write head due to contact between the detecting material and the disk resulting from excessive wear on the surface of the slider on the basis of an output signal of the detector circuit.

13. The system according to claim 12, further comprising means for informing a host system of the occurrence of the error in the write head determined by the determining means.

14. The system according to claim 12, wherein the surface of the disk is conductive, and the detector circuit of the head driver means monitors the voltage across the coil of the write head and detects an error in the write head on the basis of an abnormal voltage across the coil of the write head due to contact between the detecting material and the disk.

15. The system according to claim. 12, wherein the surface of the disk is conductive, the detector circuit of the head driver means has means for measuring the resistance of the coil of the write head, and the determining means determines that an error has occurred in the write head when an abnormal resistance of the coil of the write head is detected by the detector circuit.

16. The system according to claim 12, further comprising saving means for, when the determining means determines that an error has occurred in the write head, reading data already recorded on the disk by the read head and saving the read data on another storage medium.

* * * * *